3,107,144
PROCESS FOR CONVERTING NIOBIUM OXYCHLORIDE TO NIOBIUM PENTACHLORIDE

Wendell E. Dunn, Jr., Newark, Del., assignor to E. I. du Pont de Nemours and Company, Wilmington, Del., a corporation of Delaware
No Drawing. Filed Nov. 4, 1960, Ser. No. 67,156
4 Claims. (Cl. 23—87)

This invention relates to the production of niobium pentachloride. More particularly, it relates to an improved method for the chlorination of niobium oxychloride to niobium pentachloride.

The production of niobium chlorides is usually accomplished by reacting niobium pentoxide or a naturally occurring oxidic ore containing niobium with chlorine and carbon. The niobium end products of this reaction are niobium pentachloride and niobium oxychloride. One of the chief uses for these niobium chlorides is in the production of niobium metal. Niobium pentachloride can be directly reduced to elemental niobium by contact with hydrogen at elevated temperatures. However, niobium oxychloride cannot be reacted in the same manner. The reduction of niobium oxychloride results in the formation of oxides. Therefore, in order to utilize the niobium values of niobium oxychloride in metal production, it is first necessary to further chlorinate the oxychloride to pentachloride. The prior art method for such a chlorination involves the reaction of the oxychloride with chlorine and carbon at temperatures of about 750° C.

The present invention is an alternative method for the chlorination of niobium oxychloride to niobium pentachloride. The reactants used are gaseous niobium oxychloride and a gas containing chlorine and carbon, said gas being selected from the group consisting of chlorine admixed with carbon monoxide, phosgene, and mixtures thereof. These reactants are contacted with each other at elevated temperature in the presence of charcoal derived from a natural cellulosic product. Experience has shown that the reaction will not proceed to a satisfactory extent unless such a charcoal is present. However, the charcoal is relatively unreactive in the process of this invention, and very little of it is consumed during the chlorination process. An unusual feature of this reaction is that it can be carried out at relatively low temperatures, that is, in the range of 350° C.–600° C.

When a mixture of carbon monoxide and chlorine is used, the chlorination of this invention takes place according to the following equation:

(1) $\quad NbOCl_3 + CO + Cl_2 \rightarrow NbCl_5 + CO_2$

If phosgene is used in place of the chlorine and carbon monoxide, the reaction proceeds as follows:

(2) $\quad NbOCl_3 + COCl_2 \rightarrow NbCl_5 + CO_2$

To insure good yields, the phosgene or the admixture of chlorine and carbon monoxide should be present in the reaction zone in at least a stoichiometric amount according to the above equations. Preferably, these gases should be present in excess. This excess should be at least 5% over stoichiometric. The upper limit on the amounts of these gases is not critical except that excessively large amounts become impractical from the standpoint of economy. A practical upper limit might be set at 100% in excess of stoichiometric. The excess chlorine, either in the form of free chlorine or as combined in phosgene, insures maximum yields. The use of excess carbon monoxide, either in the form of free carbon monoxide or in chemical combination in phosgene, reduces the tendency for carbon to be consumed during the reaction. Carbon is consumed in the reaction as the result of its reducing the carbon dioxide by-product to carbon monoxide according to the following equation:

(3) $\quad C + CO_2 \rightleftharpoons 2CO$

The use of an excess of CO keeps the equilibrium of the above reaction to the left so that it is possible to prevent the above reaction from taking place to any significant extent.

The charcoal appears to function as a catalyst for the reaction, and, as previously mentioned, the charcoal used must be derived from a natural cellulosic product, such as wood and nutshells. Charcoals of this type are described by Kipling in "Quarterly Reviews," vol. 10, No. 1 (1956), in an article entitled "The Nature and Properties of Adsorbent Carbon." Activated as well as unactivated charcoals are suitable for this invention. The amount of carbon present in the reaction zone is not critical. One skilled in the art will, of course, realize that there should be a sufficient amount of carbon to come in contact with substantially all of the reactant gases during the time the gases are in the reactor. This will depend to some extent on the surface area of the charcoal. If the reacting gases are passed through the reaction zone rather than being maintained in a closed chamber, then the carbon should be situated so that there is maximum contact with the gases as they pass through the reaction zone. It has been found that a retention time of from 10–100 seconds for the reactant gases within the reaction zone is sufficient for at least 90% conversion of $NbOCl_3$ to $NbCl_5$. However, this contact time of reactant gases with carbon may be as short as 5 seconds or as long as 2 minutes or more, the upper limit of time being set only by economics with no product degradation resulting from continued contact of the product with carbon.

For a clearer understanding of the invention, the following specific examples are given. These examples are intended to be merely illustrative of the invention and not in limitation thereof. Unless otherwise specified, all parts are by weight.

EXAMPLE I

In this example, a vertical silica reactor tube 30 mm. in diameter and 40 cm. in length was used. The reactor was surrounded by an electrical resistance heating unit, and it was designed with openings for gas feed and discharge at top and bottom and an inlet in the midsection. The tube was fitted with two porous silica discs, one 15 cm. above the lower (outlet) end of the reactor; and the other 20 cm. below the upper (inlet) end of the reactor. On the upper of these two porous discs were placed pelets of $Nb_2O_5$ to a bed depth of about 10 cm. On the lower of the two discs was placed 1.9008 grams of activated wood charcoal, analyzing about 95% pure carbon, of mesh size $-16 +20$ (U.S. sieve sizes).

The production of $NbOCl_3$ and its conversion of $NbCl_5$ was accomplished by having niobium oxide pelets chlorinated by a flow of $COCl_2$ in the upper section of the reactor, and having downstream the activated carbon bed and an additional supply of chlorinating and reducing agent for the further chlorination of the product $NbOCl_3$ to $NbCl_5$.

Under the conditions described, the primary chlorination reaction which takes place when phosgene is passed over $Nb_2O_5$ pellets at 500° C. is:

(4) $\quad Nb_2O_5 + 3COCl_2 \rightarrow 2NbOCl_3 + 3CO_2$

This is a well known reaction for the chlorination of niobium oxide. Through an inlet tube in the midsection of the reactor, an additional stream of $COCl_2$ was fed to act as the chlorinating agent for $NbOCl_3$, the product of the primary chlorination.

The flow of $COCl_2$ through the inlet tube at the top of the reactor was begun and maintained at 30 millimols/min. The flow of $COCl_2$ through the tube inlet at the mid-section of the reactor, above the activated carbon bed, was begun and maintained at 20 millimols/min. The reaction was continued for a period of 6 hours, during which time the entire reactor was held at 500° C.

In order to determine the degree of conversion of the oxychloride to the pentachloride, a condenser was placed in the stream of gases evolved at the bottom end of the reactor and niobium oxychloride and niobium pentachloride which are solids at normal temperatures were condensed therein. The condensed solids thus recovered were then analyzed to determine the Cl:Nb ratio which they contained. Since there are three chlorine atoms to one niobium atom in $NbOCl_3$, a Cl:Nb ratio in the vicinity of 3:1 is indicative of a low yield of $NbCl_5$ since this ratio is caused by the presence of large amounts of $NbOCl_3$ in the off-gas stream. On the other hand, a Cl:Nb ratio of 5:1 is indicative of substantially complete conversion to $NbCl_5$. The product gases during the six hours of operation had a Cl:Nb ratio ranging from 4.6 to 4.9. This is equivalent to an 80–95% conversion of $NbOCl_3$ to $NbCl_5$. Based on a 90% utilization of $COCl_2$ by $Nb_2O_5$ pellets to produce $NbOCl_3$, and a 90% conversion of this $NbOCl_3$ to $NbCl_5$ over the carbon bed, the amount of $COCl_2$ feed above the carbon bed amounted to an excess of 28% by volume over stoichiometric according to Equation 2 above.

The activated charcoal bed which weighed 1.9008 grams when put into the reactor, and initially containing 95% carbon (1.806 grams) was removed at the conclusion of the run and was found to weigh 1.7808 grams. This bed material was analyzed and was found to be composed of 0.9400 gram carbon and 0.8408 gram of adsorbed materials. This is a loss of 0.866 gram carbon during the reaction. From this data it is evident that the charcoal does not enter into the reaction to any great extent since in order to chlorinate $NbOCl_3$ to $NbCl_5$ with the formation of $CO_2$, using charcoal as the reducing agent, it would require about 50 times (43.2 grams) the amount of carbon consumed in this example.

In order to be able to contrast directly the result obtained in using activated charcoal of naturally occurring cellulosic origin with the degree of conversion which would be obtained if a bed of carbon of other origin were used, the procedure of this example was repeated under the conditions described except that for the 1.9008 grams of activated charcoal bed, there was substituted a bed of 15 grams of carbon in the form of a petroleum coke commonly used in the chlorination of ores. The degree of conversion of $NbOCl_3$ to $NbCl_5$ was extremely low, the ratio Cl:Nb in the product being only 3.04:1.

EXAMPLE II

The effect of activation of the charcoal used in the operation of this invention may be shown by the following experiments. Two charcoal samples were obtained from a commercial supplier. These samples are identified as follows.

Charcoal #4830: A sample of charcoal of natural, cellulosic origin (pecan shells) which has received no activation treatment.

Charcoal #4832: A portion of the same charcoal as #4830, which had been subjected to standard activation treatment.

This experiment was carried out using a vertical silica reactor as is described in Example I. The reactor was fitted with two porous silica discs on the upper of which were placed pellets of $Nb_2O_5$ to a depth of about 10 cm., and on the lower of the two discs were placed the carbon samples which were to be evaluated. The inlets and outlet of the reactor tube were as described in the previous example: an upper inlet tube to feed the mixture of chlorination goes to the $Nb_2O_5$ pellets, and a second inlet in the midsection of the reactor for feeding the reducing gas for the conversion of $NbOCl_3$ to $NbCl_5$ in the presence of carbon.

In his example, the carbon bed consisted, in each part of the experiment, of 5 grams of the carbon to be tested admixed with silica of particle size —20+60 mesh. (U.S. sieve sizes). The purpose of the silica was only to add to the volume of the bed. It is, of course, unreactive under the conditions of the experiment. The reactor and contents were heated by an external resistance heating unit to a temperature of 800° C. and a stream of phosgene ($COCl_2$) was introduced into the top inlet at a flow rate of 2.4 millimols/min. As a result, $NbOCl_3$ was produced according to the reaction:

(5) $\quad Nb_2O_5 + 3COCl_2 \rightarrow 2NbOCl_3 + 3CO_2$

The product gases were passed directly into the carbon bed (downstream) and just above this carbon bed was introduced a second stream of $COCl_2$ at a flow rate of 20.0 millimols/min.

The effectiveness of the carbon was evaluated by sampling the product of the secondary chlorination to determine, at various temperatures, the degree to which the mole ratio Cl:Nb approaches 5:1. The results obtained are summarized in the following table:

*Table*

| Carbon used | Temp., ° C. | Product— mol ratio Cl:Nb | Percent conversion of $NbOCl_3$ to $NbCl_5$ |
|---|---|---|---|
| Charcoal #4830 | 350 | 3.675:1 | 33.7 |
|  | 400 | 3.775:1 | 38.2 |
|  | 450 | 3.925:1 | 45.8 |
|  | 500 | 4.245:1 | 61.8 |
|  | 600 | 4.875:1 | 93.8 |
| Charcoal #4832 (activated) | 350 | 4.600:1 | 80.0 |
|  | 400 | 4.675:1 | 83.5 |
|  | 450 | 4.675:1 | 83.5 |
|  | 500 | 4.775:1 | 88.0 |
|  | 600 | 4.775:1 | 88.0 |

EXAMPLE III

In this example, carbon monoxide and chlorine were used in place of phosgene in converting $NbOCl_3$ to $NbCl_5$.

The reactor used was similar to that described in Example I above. The temperature was maintained at 500–550° C. throughout the run. The duration of the run in this example was 30 minutes. The bed of activated carbon consisted of 3.6547 grams of the carbon described in Example I which had been dried overnight at 145° C.

$COCl_2$ was introduced through the upper inlet of the reactor tube, above the $Nb_2O_5$ pellets to effect primary chlorination of the $Nb_2O_5$, at a rate to produce 20 millimols/min. $NbOCl_3$. Chlorine was introduced at the midsection inlet above the activated carbon bed at the rate of 36 millimols/min. and carbon monoxide at the rate of 36 millimols/min. The gaseous product of this secondary chlorination was taken off through the bottom inlet of the reactor, and collected in the manner described in Example I.

The gaseous product of this experiment was analyzed, giving a Cl:Nb atom ratio of 4.8:1 which corresponds to a yield of 90%. The feed of $CO+Cl_2$ amounted to an excess of 80% by volume over the amount required for complete conversion of $NbOCl_3$ to $NbCl_5$.

The charcoal bed was removed from the reactor at the conclusion of the experiment and was found to weigh 4.2555 grams. This weight includes adsorbed chlorine and halides, the weight of which has been found by previous experiments to amount to about 30% of the bed weight when the temperature at which adsorption takes place is 500–600° C. Correcting for the adsorbed materials, the weight of the carbon remaining was 2.9788 grams, indicating a loss of only 0.6757 gram of carbon.

EXAMPLE IV

In this experiment, the reduction and chlorination of NbOCl₃ using COCl₂ as a reducing agent was carried out in a fluidized bed of activated charcoal. A reactor similar to that described in Example I was used except that the gas flow was upward through the reactor. The primary chlorination of Nb₂O₅ pellets to produce the feed gas for the activated carbon bed was carried out in a separate reactor. The gases from this primary reactor were introduced to the bottom inlet of the vertical reactor containing the porous plate and activated carbon bed. The activated carbon bed consisted of 5 grams of the charcoal described in Example I. This charcoal had been pre-dried overnight at 140° C.

A mixture of 0.67 millimol/min. NbOCl₃, 0.67 millimol/min. CO₂ and 21.5 millimols/min. COCl₂ was introduced through the perforated porous plate supporting the activated charcoal bed. This rate of gas flow was sufficient to fluidize the bed, and the gas feed was continued at this rate until a total of 780 millimols of NbOCl₃ had been fed to the fluidized bed in 19.4 hours. The temperature of the bed was maintained at 600° C. throughout the run.

During the run, several samples of product gas were analyzed and the average Cl:Nb atom ratio was 4.65:1. This represents a mol conversion of NbOCl₃ to NbCl₅ of 82.5%.

At the temperature of this experiment, 600° C., it has previously been found that halides and chlorine will be adsorbed to about 20% of the bed weight.

The 5 grams of carbon used as fluidized bed material absorbing a 20% load would weight 6.0 grams. Bed weighing 4.4492 grams was recovered at the conclusion of the experiment. At least a portion of this 1.5 grams loss of bed material was due to abrasion.

If C were consumed according to the reaction:

(6) $C + 2Cl_2 + 2NbOCl_3 \rightarrow 2CO_2 + 2NbCl_5$ 4.680 grams carbon would have been consumed.

The niobium oxychloride used in this invention may be from any source. It will be seen that in the examples, the oxychloride was produced by the chlorination of Nb₂O₅. However, it should also be pointed out that NbOCl₃ from the chlorination of oxidic, niobium ores can be used.

The reaction described herein has also been found to be applicable to the conversion of other oxychlorides to chlorides. The following reactions will take place more rapidly and the yield of the metal chloride can be increased if an activated carbon surface is provided upon which the chlorination reaction may take place:

(7) $WOCl_4 + CO + Cl_2 \rightarrow WCl_6 + CO_2$
(8) $WO_2Cl_2 + 2CO + 2Cl_2 \rightarrow WCl_6 + 2CO_2$
(9) $MoOCl_3 + CO + Cl_2 \rightarrow MoCl_5 + Co_2$ Since it is obvious that many changes and modifications can be made in the above-described details without departing from the nature and spirit of the invention, it is to be understood that the invention is not to be limited to said details except as set forth in the appended claims.

The embodiments of the invention in which an exclusive property or privilege is claimed are defined as follows:

1. In a process for the conversion of niobium oxychloride to niobium pentachloride the step comprising effecting contact between (1) gaseous niobium oxychloride, (2) gas containing chlorine and carbon, said gas being selected from the group consisting of chlorine admixed with carbon monoxide, in about equimolar proportions, phosgene, and mixtures thereof, and (3) a charcoal prepared from a natural cellulosic product, in a chlorination zone held at temperatures in the range of 350° C.–600° C., the amount of gas containing chlorine and carbon introduced into the chlorination zone being at least 5% in excess of stoichiometric based on the conversion of niobium oxychloride to niobium pentachloride with the formation of carbon dioxide, whereby reaction occurs between the niobium oxychloride and the gas containing chlorine and carbon to effect the said conversion.

2. The process of claim 1 in which the gas containing chlorine and carbon is chlorine admixed with carbon monoxide in about equimolar proportions.

3. The process of claim 1 in which the gas containing chlorine and carbon is phosgene.

4. The process of claim 1 in which the gas containing chlorine and carbon is a mixture of chlorine, carbon monoxide in about equimolar proportions, and phosgene.

References Cited in the file of this patent

UNITED STATES PATENTS

| | | |
|---|---|---|
| 1,509,605 | McKee | Sept. 23, 1924 |
| 1,544,328 | McAfee | June 30, 1925 |
| 1,843,355 | Behrman | Feb. 2, 1932 |
| 2,870,073 | Merlub-Sobel et al. | Jan. 20, 1959 |
| 2,969,852 | Jacobson | Jan. 31, 1961 |

FOREIGN PATENTS

| | | |
|---|---|---|
| 801,386 | Great Britain | Sept. 10, 1958 |

OTHER REFERENCES

Spitsyn et al.: Chem. Abs., vol. 35, page 2433 (1941).
Urazov et al.: Chem. Abs, vol. 31, page 4460 (1937).
Kipling: article in Quarterly Reviews, vol. 10, No. 1, pp. 1–12; 19 (1956).
Sue: Chemical Abstracts, vol. 33, page 3714 (1939); original article in Comptes Rendus, vol. 208, pages 814–16 (1939).